United States Patent [19]

Horiye et al.

[11] 4,015,568
[45] Apr. 5, 1977

[54] INTAKE MANIFOLD PRESSURE REGULATOR OF INTERNAL COMBUSTION ENGINE

[75] Inventors: Masakazu Horiye, Tokyo; Kenichi Sasaki; Mitsutaka Konno, both of Yokohama, all of Japan

[73] Assignee: Nissan Motor Co., Ltd., Yokohama Japan

[22] Filed: Sept. 12, 1975

[21] Appl. No.: 612,864

[30] Foreign Application Priority Data

Sept. 17, 1974 Japan .................. 49-11863[U]

[52] U.S. Cl. .................. 123/124 R; 123/97 B; 123/119 D; 261/41 D; 261/DIG. 19
[51] Int. Cl.² .................. F02M 23/04; F02M 7/12
[58] Field of Search ......... 123/97 B, 124 R, 119 D, 123/119 DB; 137/480, 482, 479; 261/41 D, DIG. 19

[56] References Cited
UNITED STATES PATENTS

| | | | |
|---|---|---|---|
| 3,450,115 | 6/1969 | Toda et al. .................. | 123/119 DB |
| 3,470,855 | 10/1969 | Von Seggean et al. ........ | 123/119 D |
| 3,547,089 | 12/1970 | Pierlot .................. | 123/97 B |
| 3,795,237 | 3/1974 | Denton .................. | 123/97 B |
| 3,955,364 | 5/1976 | Lewis .................. | 123/97 B |

Primary Examiner—Wendell E. Burns

[57] ABSTRACT

A by-pass connecting an induction passage and an intake manifold around a throttle valve is controlled by a by-pass valve which is operated by a pressure at a port opening to the induction passage just upstream of the closed throttle valve. During deceleration, atmospheric pressure is gradually applied to the port closing the by-pass valve.

5 Claims, 8 Drawing Figures

INTAKE MANIFOLD PRESSURE REGULATOR OF INTERNAL COMBUSTION ENGINE

This invention relates generally to an air/fuel intake system for an automotive internal combustion engine and more particularly to an improved apparatus to regulate intake manifold vacuum for the purpose of reducing emission of hydrocarbons in the engine exhaust.

It is widely recognized that emission of hydrocarbons is most serious during vehicle deceleration with a closed throttle valve in which the engine creates an abnormally high manifold vacuum. This is because, in such condition, each engine cylinder is supplied with reduced and diluted charge of air/fuel mixture for combustion at a decreasing compression pressure, so that proper ignition and combustion of the mixture is extremely difficult.

Accordingly, a general object of this invention is the provision for reducing emission of unburned hydrocarbon in the engine exhaust. Another object of this invention is to provide an improved apparatus for regulating manifold vacuum during engine decleration. A further object is to provide the appartus of the character above for admitting additional air or air/fuel mixture through a by-pass around and exclusive of the throttle valve into the intake manifold during an incipient deceleration.

The aforementioned and other objects are accomplished in the present invention by incorporating a manifold pressure regulator between an induction passage and intake manifold of an internal combustion engine. The internal combustion engine may be of the usual type having one or more carburetors or of the fuel injection type or others. Specifically the engine comprises an induction passage for supplying air or air/fuel mixture into the intake manifold which distributes the combustible mixture or air to the engine combustion chambers. The speed of engine is controlled by throttle valve means which regulates the quantity of air or mixture supplied to the engine.

The manifold pressure regulator of this invention comprises a by-pass around the throttle valve connecting the induction passage and the intake manifold. A differential pressure operated by-pass valve, as is known per se, is disposed in said by-pass to regulate air flow through said by-pass. It is distinctive of this invention that a source of by-pass valve operating differential pressure is formed by a port opening to the induction passage in the vicinity and upstream of the throttle valve in its closed position, while the port is positioned downstream of the throttle when it is moved to an open position.

During deceleration with the throttle valve fully closed, the substantially atmospheric pressure prevails in said port. The by-pass valve is arranged to open by the action of said atmospheric pressure but with a substantial retard. Thus, a calibrated amount of air or air/fuel mixture is admitted into the intake manifold through the by-pass still after the throttle is fully closed. The abnormally high manifold vacuum tending to develop in the intake manifold is thus reduced to a proper level enabling ignition and burning of the combustible mixture.

In conventional manifold pressure regulators, the by-pass valve is actuated to open the by-pass for supplying supplementary air, only after the rise in vacuum in the intake manifold has been sensed by any sensor, e.g. of a diaphragm type. There exists a substantial lag or retard between vacuum sensing and actual supply of by-pass air. Accordingly, it has been difficult to prevent abrupt increase in vacuum during such lag time. By the by-pass valve of this invention being controlled directly by the pressure at the port opening to the induction passage rather than by intake manifold vacuum, such time lag is essentially eliminated.

Among the several advantages of this invention, therefore, the important one is quicker and more dependable response in operation to the incipient deceleration than in conventional apparatuses. Other advantages are applicability to a large variety of engine types and simple structure without extreme manufacturing precision being required.

Further objects and advantages of this invention will be apparent from the following description, reference being had to the accompanying drawings, wherein a preferred embodiment of this invention is clearly shown.

Figure 1:
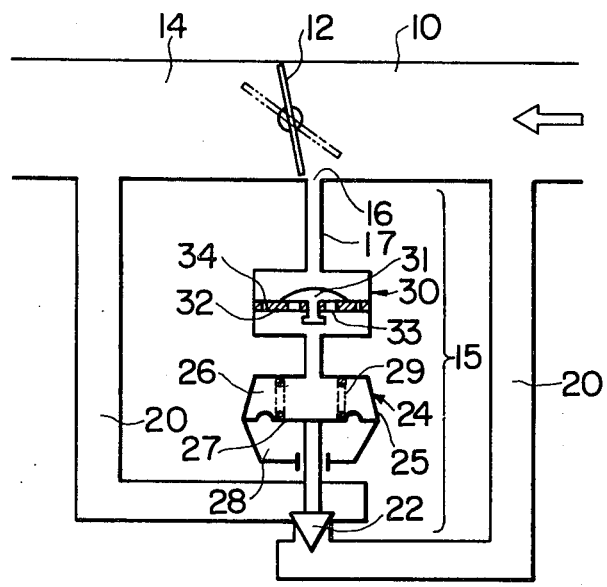
FIG. 1 is a schematic view in section of an induction passage and intake manifold assembly with a manifold pressure regulating apparatus according to this invention.

With reference to FIG. 1, the engine (not entirely shown) generally comprises an induction passage 10 which communicates with the intake manifold 14 through a throttle valve 12 in more or less open position. The induction passage 10 may be provided with a venturi and a main fuel jet opening to the venturi and other necessary parts forming the usual carburetor, though not shown.

A by-pass 20 is formed to connect the induction passage 10 and the intake manifold 14 around the throttle valve. According to this invention the manifold pressure regulator assembly generally indicated by numeral 15 comprises a by-pass valve 22 disposed in the by-pass 20 for controlling air flow through the by-pass from the induction passage to the intake manifold and a known diaphragm motor 24 for operating the by-pass valve 22. The housing 25 of diaphragm motor is divided by a diaphragm 27 into two chambers 26 and 28, 28 of which is open to the atmosphere through one or more openings (no number). The other chamber 26 accommodates a diaphragm spring 29 with a preset load which urges the by-pass valve 22 securely connected to the diaphragm 27 to close the by-pass.

According to this invention, an air port 16 is located immediately above the closed position of the throttle 12. The port 16 communicates with the chamber 26 of the diaphragm motor 24 through a conduit 17 and a pressure control valve 30 which will be later described. It is thus apparent that the diaphragm 27 is acted upon by the pressure prevailing in or adjacent the port 16 in accordance with each throttle position.

Figure 3:
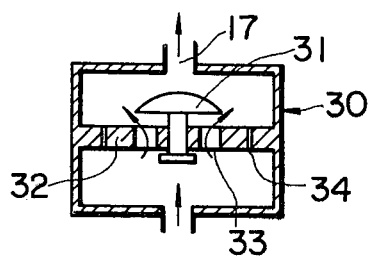
FIGS. 3 and 4 are detailed views in section of part of the apparatus shown in FIG. 1, showing the different modes of operation.
Figure 4:
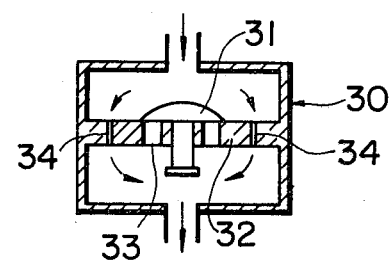

Disposed in the conduit 17 is the pressure control one-way valve 30, details of which are best seen in FIGS. 3 and 4. The valve 30 includes a valve head 31 of poppet type which can be lifted from a valve seat 32 to leave two valve openings 33 open as soon as the pressure in the chamber 26 exceeds the pressure at the port 16. On the other hand, the valve head 31 is seated to block the valve openings 33 by the air pressure at the port 16 being higher than that in the air chamber 26. The valve seat 32 is further provided with one or more metering throttle orifices 34, preferably formed by the wall of a sintered porous alloy, which are bored through the valve seat in parallel with the valve openings 33. A modified arrangement is possible such that the port and the diaphragm motor is connected directly by a conduit in which the orifices are formed and the one-way valve is located in a passageway bypassing the orifice in parallel with the conduit, though not illustrated. The throttle orifices 34 provide constant fluid communication between the port 16 and the chamber 26 without being influenced by seating and unseating of the valve head. When the positive pressure or the substantially atmospheric pressure is dominant in the vicinity of the port 16, air is gradually passed through the orifices 34 into the chamber 26, though the valve head tightly bears on the valve seat.

Figure 2:
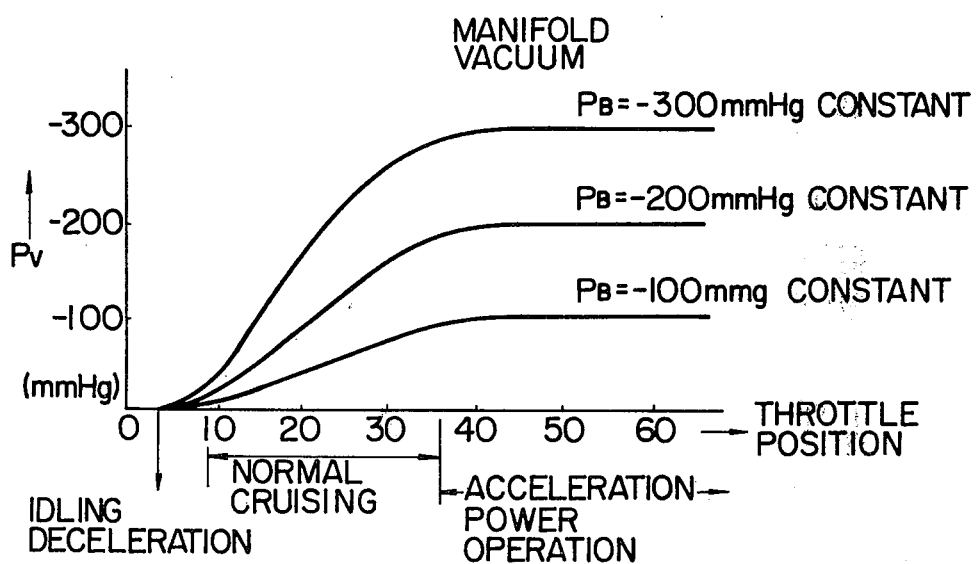
FIG. 2 is a graphical representation of the air pressure or vacuum for operating the manifold pressure regulator of this invention varying in relation to the throttle position.

The operation of the manifold pressure regulator of this invention is dependent on the pressure level at the port 16, the variation of which is graphically shown in FIG. 2. As shown, the pressure at the port 16 represented by symbol $P_v$ is reduced or the vacuum $P_v$ is increased in substantial proportion to the degree of throttle opening until the throttle reaches a certain opening position, for instance, existing between 10°–35° as illustrated. Once said certain throttle position is reached, the pressure $P_v$ is kept at a substantially constant level which coincides with the intake manifold pressure $P_B$ at that instant, irrespectively of further movement of the throttle to the open position. In other words, the intake manifold pressure directly acts upon the port 16 with the throttle in said certain or wider opening position. The resultant constant level of the pressure $P_v$ and $P_B$ is varied between the individual engine conditions as exemplified by the three curves in FIG. 2.

In actual operation, during idling condition of the engine, the throttle 12 is almost closed so that the air port 16 is positioned upstream of the throttle. As a result, the pressure $P_v$ is substantially atmospheric, the air being admitted through the orifices 34 of the control valve 30 into the chamber 26 of the diaphragm motor 24. The diaphragm 27 is therefore moved by the action of the spring 29 to close the valve 22. By-pass air flow is hereat interrupted, while only the required amount of air, metered at the throttle valve as usual, is fed into the intake manifold 14.

Upon acceleration from idling for power operation, the pressure $P_v$ drops or the vacuum $P_v$ rises abruptly with sudden movement of the throttle to a wide open position. The valve head 31 is then lifted from the seat 32 by the suction in the vicinity of port 16, hence the air in the chamber 26 is escaped through both the valve openings 33 and orifices 34. Thus, a vacuum substantially equal to the vacuum $P_v$ is obtained in the chamber 26 which causes the diaphragm 27 to move upward to open the by-pass valve 22. A certain quantity of additional air is then supplied through the by-pass 20 to the intake manifold 14. The amount of additional air through the by-pass 20 is relatively small in contrast to the large volume of air passing the throttle valve in this condition and therefore will hardly affect or alter the instant engine condition dependent on the amount of air metered at the open throttle valve.

During normal cruising operation, the vacuum $P_v$ is decreased substantially linearly as the throttle approximates the closed position as illustrated in FIG. 2. The by-pass valve 22 is thus kept open, by-pass air being supplied to the engine. The sum of the air passing the throttle and the additional air through the by-pass may probably be more than that required for this particular engine condition. In order to check such excessive air supply, it is preferable to adjust the throttle position in consideration of the volume of the by-pass air, said volume being determined in the manner to be further described.

Figure 5:
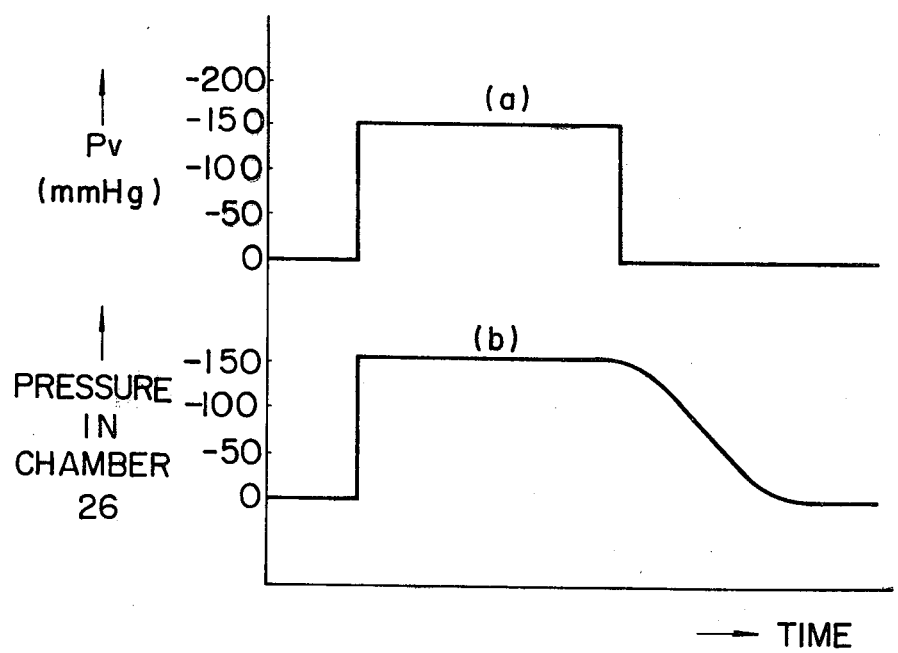
FIG. 5 is a graphical representation of the variation in pressure for operating the manifold pressure regulator in relation to time according to this invention.

As soon as the engine decelerates when the throttle is moved to the closed position, the pressure $P_v$ is immediately equalized with the atmospheric as indicated by curve (a) of FIG. 5. The valve head 31 is then seated on the valve seat 32 by the action of pressure $P_v$ thus blocking the valve openings 33. However, atmospheric air is gradually allowed through the orifices 34 into the chamber 26. Consequently, the pressure in the chamber 26 tends to increase gradually as indicated by curve (b) of FIG. 5. The by-pass valve 22 thus gently moves to close the by-pass 20. It follows that a quantity of air is admitted into the intake manifold through the by-pass still during incipient deceleration so as to reduce the high manifold vacuum. Actually, the manifold vacuum level as in the idling condition is reached by such supply of supplementary air.

Figure 6:
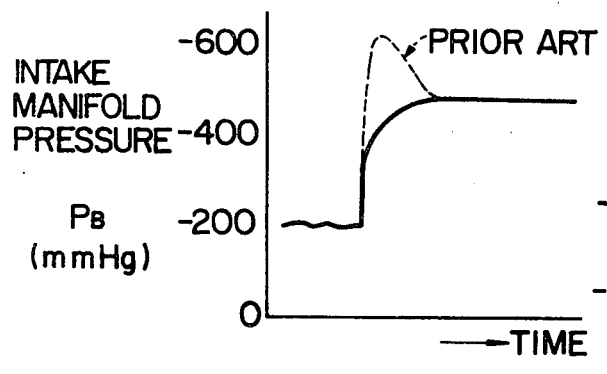
FIG. 6 is a graphical representation of variation in the manifold pressure during deceleration according to this invention, in comparison with that according to a prior art apparatus.

Manifold pressure regulating effect of this invention is more apparent from FIG. 6 in comparison with that in conventional engines. As shown, the manifold vacuum sharply rises during the incipient deceleration in prior art engines, while by this invention, such sharp rise is advantageously eliminated.

Figure 7:
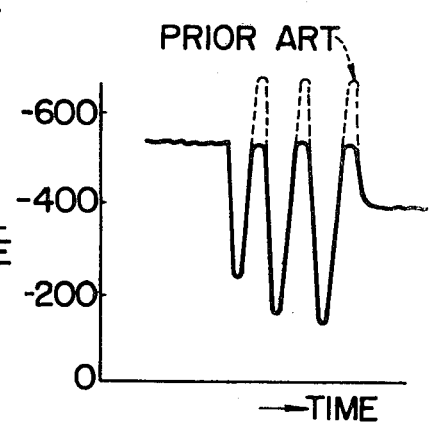
FIG. 7 is similar to FIG. 6 but during transmission gearshift operation.

Abrupt movement of the throttle valve to the closed position occurs not only during deceleration but also during gear shift operations in a usual transmission, inevitably causing high emission of hydrocarbon and carbon monoxide in the exhaust. As is apparent from FIG. 7, the closing and opening movements of the throttle valve alternate at momentary intervals during gearshift operations. Each time the throttle is closed, the vacuum amounts to an extremely high level as indicated by the broken line curve in FIG. 7, in conventional engines. According to this invention as described above, the vacuum level is maintained at an appropriate level as depicted by the solid line curve in FIG. 7. In this respect, it is most beneficial that the manifold pressure regulator of this invention is able to quickly respond to the incipient deceleration or momentary swing to the throttle closed position as already described.

In order to efficiently operate the apparatus of this invention, the quantity of by-pass air has to be optimized; if the by-pass air flow is too small, desired efficiency in emission control could not be achieved, while if too large, the engine torque variation during movements of the by-pass valve will be great causing unstable operation of the vehicle.

Figure 8:
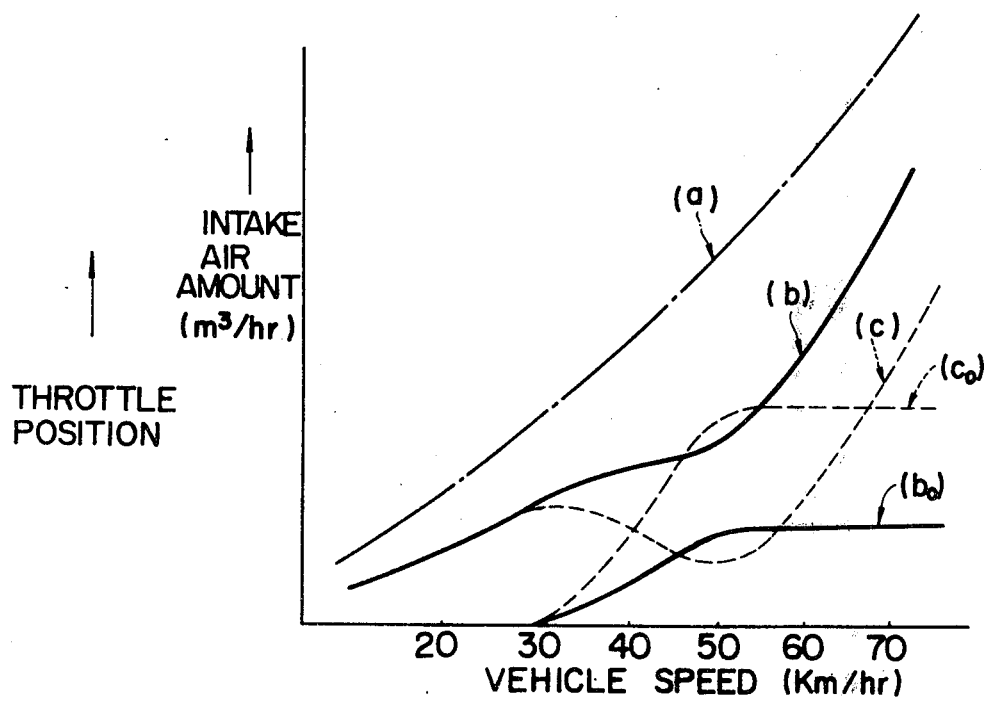
FIG. 8 is a graphical representation showing the required amount of by-pass air in relation to the throttle valve position.

Practically, the optimum quantity of the by-pass air can be chosen in the following manner, reference being made to the graph of FIG. 8, showing the relationship between the vehicle speed and the throttle position or the amount of intake air passing through the throttle. In FIG. 8 the curve ($a$) indicates the total amount of air required for proper operation of the engine. It is assumed that curves ($b_o$) and ($c_o$) indicate respectively the differently set amounts of by-pass air. Then, the volume of throttle metered air should follow the curve ($b$) in case of the by-pass air following the curve ($b_o$) and the curve ($c$) in case of the curve ($c_o$), holding the equations $b_o + b = a$, $c_o + c = a$.

As shown, in case of curve ($b$), the throttle valve position is substantially linearly varied so that operation of the vehicle can be relatively stable. On the other hand, the curve ($c$) indicates that the throttle valve must be closed transiently when the by-pass valve tends to open, otherwise sudden increase in engine torque will be caused. As the throttle valve is closed along the curve ($c$), the pressure in the chamber 26 will drop closing the by-pass valve 22, whereupon the total amount of air into the intake manifold will become less than required. In order to compensate for such shortage of air, the throttle valve will be then abruptly moved to the open position, which often results in excess of air. Such excess and shortage of air will alternate, causing the vehicle speed to undesirably fluctuate. It is thus preferable to set the volume of by-pass air to follow substantially the curve ($b_o$), of course considering also other factors such as type of engine, environmental conditions and the like.

The apparatus according to this invention is usable together with either the carburetor type engine or fuel injection type engine. In the former, the flow through the by-pass is preferably of air fuel mixture, though air alone may be enough if the mixture is made richer than usual. Of course, merely air is passed through the by-pass valve in case of the fuel injection type engine.

What is claimed is:

1. An intake manifold pressure regulator of an internal combustion engine having an induction passage and an intake manifold communicable through a throttle valve, comprising a port means so located and arranged that substantially atmospheric pressure prevails at said port means when the throttle valve is in its fully closed position, while the pressure at said port means drops below the atmospheric as the throttle valve moves to an open position; a by-pass around and exclusive of said throttle valve; a by-pass valve in said by-pass; means operatively connected to said by-pass valve and being responsive at a predetermined retard to the substantially atmospheric pressure at said port means for closing said by-pass valve to prevent by-passing around and exclusive of said throttle valve.

2. An intake manifold pressure regulator according to claim 1, in which the port means opens to the induction passage immediately upstream of the fully closed throttle valve and is positioned downstream of the throttle valve as it moves to an open position.

3. An intake manifold pressure regulator of an internal combustion engine having an induction passage and an intake manifold communicable through a throttle valve, comprising a port means so located and arranged that substantially atmospheric pressure previals at said port means when the throttle valve is in its fully closed position, while the pressure at said port means drops below the atmospheric as the throttle valve moves to an open position; a by-pass around and exclusive of said throttle valve; a by-pass valve in said by-pass; a diaphragm motor connected to the by-pass valve and being operable by the air pressure at said port means, said motor being operative to cause the by-pass valve to close upon application of the substantially atmospheric pressure to a diaphragm; a pressure control means located between the port means and the diaphragm motor to control the air pressure applied to the diaphragm for retarding the application of the atmospheric pressure to the diaphragm for a predetermined time after the air pressure at the port means reaches the atmospheric level.

4. An intake manifold pressure regulator of an internal combustion engine having an induction passage and an intake manifold communicable through a throttle valve, comprising a port means so located and arranged that substantially atmospheric pressure previals at said port means when the throttle valve is in its fully closed position, while the pressure at said port means drops below the atmospheric as the throttle valve moves to an open position; a by-pass around and exclusive of said throttle valve; a by-pass valve in said by-pass; a diaphragm connected to the by-pass valve and exposed to an air pressure chamber communicable with the port means, said diaphragm being operative to cause the by-pass valve to close when substantially the atmospheric pressure prevails in the air pressure chamber; a one-way valve located between the port means and the air pressure chamber to allow air flow from the air pressure chamber to the port means; and at least one throttle orifice means located in parallel with said one-way valve between the port means and the air pressure chamber to allow bidirectional air flow between the port means and the air pressure chamber, whereby the by-pass valve is opened in quick response to rise in vacuum in the port means while it is closed a predetermined time after the air pressure in the port means reaches substantially the atmospheric level.

5. An intake manifold pressure regulator according to claim 4, in which the throttle orifice means is formed through a valve seat of said one-way valve.

* * * * *